UNITED STATES PATENT OFFICE.

WILLIAM A. HALL, OF BELLOWS FALLS, VERMONT, ASSIGNOR TO THE LACTROID COMPANY, OF NEW JERSEY.

SOLID CASEIN.

SPECIFICATION forming part of Letters Patent No. 649,690, dated May 15, 1900.

Application filed May 13, 1899. Serial No. 716,760. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Solid Casein and Process of Producing Same, of which the following is a specification.

This invention or discovery has for its object to provide a comparatively cheap, but reliable, substitute for vulcanized fiber, hard rubber, or similar substances, and more particularly to provide a cheap and efficient material for use as an electrical insulator, my new product, unlike the molded products just referred to, being produced by a shrinking or drawing together of the hydrated casein into a homogeneous solid body or mass of substantially uniform density.

I have discovered that casein (or, in its cruder form, curd of skimmed milk) has, when properly prepared by hydrating the same, a tendency to shrink or be drawn together as hydrated fibers, commonly called "pulp."

If casein or curd be ground when in a wet state into a fine powder or flocculent mass, it can be made into blocks, sheets, or boards in the same manner as rag fiber or wood-pulp. To render the curd capable of being adapted for this purpose, it must be mixed with a large amount of water. In other words, the particles of casein or curd must be thoroughly agitated and ground in water, so that the water is beaten into every cell, thus producing a pulp which can be drained in molds or on draining-screens with wire-cloth bottoms similar to those commonly employed in the manufacture of "hand-made" papers. When the hydrated casein is thus placed in molds or on screens, as above stated, the water will be drawn off through the wire-cloth bottoms, and this will require more time than is necessary with vegetable fibers. In other words, the hydrated pulp should remain in the molds or on the draining-screens until a shrinking action has begun, as I have discovered that the knitting together of the comminuted particles is due to a shrinking or a drawing together of the particles, forming a homogeneous mass, although no solution of the particles has actually taken place. When the pulp has been thus run into molds or placed on draining-screens, it soon forms a tough compact mass, which may be removed and allowed to dry slowly, and in thus drying the shrinking or drawing together of the particles of the hydrated casein causes the water in some way to be expelled from the entire mass, or it is absorbed from the inner portions of the mass by the outer portions thereof, so that the mass becomes hard and dry throughout. When thoroughly dried, the compacted casein mass becomes hard, although not brittle, but is, on the contrary, very tough and to a certain extent flexible or elastic or resilient and is adapted for use as a cheap and efficient substitute for pulp-board, vulcanized fiber, vulcanite, celluloid, horn, hard rubber, &c., and is, as above stated, particularly well adapted for use as an electrical insulator, as casein or curd is well known to be an excellent insulating substance. The advantages of this hardened hydrated casein or caseinoid are its cheapness, non-inflammability, non-absorbtiveness, as also its resilience and toughness and freedom from deterioration.

The product may be varied to some extent by the precipitant employed in curding the skimmed milk. Rennet as a curding agent gives one result, acid another, and acid salts (such as lead acetate) another, the latter producing a particularly hard product.

If it be desired to render the plates, blocks, or boards formed from the hydrated casein waterproof or non-absorbent, this may easily be done by immersing them in any suitable sizing mixture—such as oil or gums, resin, or wax solutions—which will strike in and fill the pores; but even without such treatment they will not dissolve or separate in water. If it be desired to make these plates, blocks, or boards proof against an alkali, they may be soaked in a weak acid solution or in alum or formaldehyde, or in a combination of any of these substances. These plates, blocks, or boards may be further toughened by immersing them in certain solutions, such as acetate of lead or zinc chlorid, or by boiling in water.

This new product is entirely unlike other casein solids which have been attempted before. There have been two processes heretofore employed in the manufacture of casein solids, neither of which have been successful and neither of which is in commercial use at the present time. In one of these processes finely-ground dry casein was subjected to great pressure between heated plates, the heat softening or melting the casein to a very slight extent, the pressure causing the particles to adhere together. The objection to this process was that a heat sufficient to soften the casein would usually burn it to a slight extent, causing the finished article to be extremely brittle. The articles thus made will always be dark in color. The other process has been simply to make as heavy a solution of casein as possible, using alkali as a solvent, running this into molds, and then drying it out. The finished article thus made was soluble in water, very brittle, and when perfectly dry would crack of its own accord. Furthermore, it was very difficult to dry out such an article, as it would soften and run if any artificial heat were applied. The drying could usually be only atmospheric. Moreover, this atmospheric drying required a great length of time, and the product could never be made to dry uniformly, the outside drying first and the center remaining soft and corky.

My improved hardened casein is in contradistinction to the solid casein heretofore produced, very tough and to a certain extent flexible and elastic and of substantially the same density throughout instead of being, like the previous solid caseins, brittle when fully dry and when in thick masses soft inside and hard outside.

Having thus described my invention or discovery, I claim and desire to secure by Letters Patent—

1. As a new manufacture, plates, boards or blocks of solid casein characterized by toughness, and, to some extent, by flexibility and resilience.

2. As a new manufacture, waterproof or non-absorbent plates, boards, or blocks of solid casein characterized by toughness and, to some extent, by flexibility and resilience.

3. As a new manufacture, hardened or solid hydrated casein characterized by toughness, resilience and substantially-uniform density, and the particles of which have been compacted by a shrinking together of the mass in drying.

4. The herein-described process for producing solid homogeneous casein, consisting in hydrating the casein by grinding and thoroughly agitating the same in water so that the water is beaten into every cell thereof, thus forming a thin pulp, and afterward removing the surplus water from the casein pulp by draining, and then drying the product and permitting the same to shrink together.

In testimony whereof I affix my signature in the presence of two witnesses.

WILLIAM A. HALL.

Witnesses:
EDWARD SCHOPP,
CUSHING ADAMS.